(12) United States Patent
Hession et al.

(10) Patent No.: US 7,457,404 B1
(45) Date of Patent: Nov. 25, 2008

(54) METHODS OF MONITORING COMMUNICATIONS SESSIONS IN A CONTACT CENTRE

(75) Inventors: Patrick Hession, Galway (IE); Tony McCormack, Galway (IE); James Hickey, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 394 days.

(21) Appl. No.: 10/741,518

(22) Filed: Dec. 19, 2003

(51) Int. Cl.
*H04M 3/523* (2006.01)
*H04M 1/64* (2006.01)

(52) U.S. Cl. .............................. 379/265.07; 379/88.01

(58) Field of Classification Search . 379/265.02–266.1, 379/309, 88.01, 88.02
See application file for complete search history.

(56) References Cited

U.S. PATENT DOCUMENTS

| | | | |
|---|---|---|---|
| 6,275,806 B1 * | 8/2001 | Pertrushin | 704/272 |
| 6,411,687 B1 * | 6/2002 | Bohacek et al. | 379/88.21 |
| 6,542,602 B1 * | 4/2003 | Elazar | 379/265.06 |
| 6,600,821 B1 * | 7/2003 | Chan et al. | 379/265.07 |
| 6,868,154 B1 * | 3/2005 | Stuart et al. | 379/265.06 |
| 7,043,008 B1 * | 5/2006 | Dewan | 379/265.06 |
| 7,151,826 B2 * | 12/2006 | Shambaugh et al. | 379/265.02 |

* cited by examiner

*Primary Examiner*—Harry S Hong
(74) *Attorney, Agent, or Firm*—Barnes & Thornburg, LLP (57) ABSTRACT

A method of monitoring a communications session between an agent of a contact centre and a user of that contact centre involves analysing data from the session to locate a pattern of data indicative of a situation requiring intervention in the communications session, such as a prolonged silence, shouting, or one or more words and phrases from a stored list. The analysis can also look for a pattern of data indicative of a situation in which the agent might benefit from additional information available to the contact centre (such as a help facility or access to information regarding the user). On recognising such a pattern of data, an alert is issued to a system of the contact centre, in order to notify a human supervisor or an automated system to intervene in the communications session or to provide the agent with additional information.

17 Claims, 4 Drawing Sheets

METHODS OF MONITORING COMMUNICATIONS SESSIONS IN A CONTACT CENTRE

TECHNICAL FIELD

This invention relates to the monitoring of communications sessions in a contact centre between an agent and a user or customer of the contact centre.

BACKGROUND ART

In a call centre or multimedia contact centre the majority of communications are between users or customers of the contact centre and agents of the contact centre who interact with the customers. The interactions are normally in the form of communications sessions which can be voice calls, video calls, chat sessions, use of messaging sessions or exchanges of emails, for example.

Most contact centres also employ supervisors who monitor agent resources to ensure the smooth functioning of the contact centre. The supervisors will generally also be provided with an overview of the status of the contact centre or of agents under their control, and most contact centre technology allows a supervisor to eavesdrop on or conference into a particular communications session and to intervene if it is deemed necessary.

A problem with this scenario is that it can be difficult for a supervisor in charge of a large number of agents to determine which agents may require intervention. Normally, supervisors rely on pop-up requests on their display which are generated in response to an agent request for supervisor input. A difficulty with this is that an agent who is involved with an altercation with a customer may not want to alert the supervisor. For example, the agent may not be adhering to guidelines regarding behaviour or language and may therefore wish to conceal the altercation from the supervisor. Similarly, if an incident occurs because a customer is dissatisfied with the service received from an agent, then the agent may not wish to alert the supervisor and may prefer to try to resolve the matter himself or herself, even if this matter could be more quickly resolved by referring the customer to a supervisor or referring to the supervisor for advice.

Many experienced supervisors therefore rely not only on requests initiated by the agents, but also by monitoring the duration of a communications session. If a telephone call or chat session is unusually long, this can be an indicator of a problem warranting further investigation. This is, however, far from foolproof. An argument can develop between a customer and an agent quite quickly and a customer may hang up or log off dissatisfied. In this case the contact centre may lose a customer without there having been any record that this was due in part to the behaviour of the agent.

In addition to situations requiring intervention due to unsatisfactory communications taking place, problems arising, or an agent initiating a request for assistance, there are also cases where an agent would welcome additional information to enable the communication to be dealt with more quickly and smoothly.

Certain contact centre technologies will use call progress data (including calling line ID and interactive voice response (IVR) inputs) to generate contact-specific screen pops when an agent receives a contact. For example, if a bank customer is recognised by a bank contact centre system from the originating phone number or from an IVR login, a screen pop containing the customer's basic account information may be generated at the agent workstation when an agent is assigned the call. Such assistance is not always helpful. As an example, the customer may be making an enquiry relating to a different account other than the default account, in which the wrong details might be presented. Or the customer may be ringing to apply for a loan, in which case the agent will be concerned with the customer's credit rating as maintained by a credit bureau rather than the details of the customer's existing account(s).

It can therefore be seen that there are drawbacks with the manner in which contacts are currently supervised in contact centres. There are also problems from the point of view of agents in being provided with relevant assistance at the right time.

DISCLOSURE OF THE INVENTION

The invention provides a method of monitoring a communications session between an agent of a contact centre and a user of that contact centre. The method comprises the steps of:
a) receiving data from the communications session,
b) analysing the data to locate a pattern of data indicative of a situation arising in the communications session for which an alert has been prescribed, and
c) on recognising the pattern of data, issuing an alert to a system of the contact centre.

Rather than relying on agent-originating alerts or help requests, therefore, or on a supervisor using judgement to intervene in a session based on the duration of the session, the invention provides an automated method which monitors elements of the data for patterns which are known to be indicative of a problem in the session or of an opportunity to assist the agent or customer. Thus, even in cases where an agent wishes to conceal a problem or a customer is in danger of hanging up or logging off before a supervisor notices that there may be a problem, or the agent is unaware that further assistance or information might be available from another system of the contact centre, this method may detect a pattern match in the communication between the agent and customer allowing intervention to be effected or assistance to be given immediately.

In one preferred embodiment, the alert is effective to notify a human supervisor or an automated system to effect an intervention in the communications session.

An example of this is where certain words or phrases are detected indicating an argument between the customer and agent. This provides a detectable pattern of data which can be recognised to allow an alert to issue to a supervisor, for example.

In another preferred embodiment, the alert is effective to provide the agent with information which is available to a system of the contact centre and which appears relevant to the data exchanged in the communications session.

An example of this is where key words or phrases (e.g. an order number or account number) are detected indicating that relevant information may be available in another system of the contact centre (such as an account information database). Matching such a pattern can result in intelligent, context-sensitive help being automatically provided to the agent.

While the invention embraces communications such as email communications, preferably the communications session is a real-time communications session and the step of analysing the data is performed in real time as the communications session progresses. In this way the alert can issue in real time to affect the communications session in the event of such a situation arising.

Suitably, therefore, the communications session can be a voice telephony call, a video call, an Internet chat session or an instant messaging session.

Preferably, when the communications session is a voice call or a video call which includes speech data, the step of analysing data involves recognising words or phrases in speech data and comparing the recognised words or phrases with one or more stored lists, such that the "pattern" to be detected is a match between a spoken word or phrase and an entry in the one or more stored lists.

There can be a number of stored lists, some specific to words and phrases which might be spoken by an agent when intervention is required and some specific to words and phrases which might be spoken by a user or customer when intervention or assistance is required. The different lists can also include words or phrases such as expletives which are problematic whether spoken by an agent or a customer. The different lists can be categorised according to perceived seriousness, i.e. a phrase on one list might be only slightly indicative that there might be a problem, whereas a word on a different list might be always indicative of a very serious communications problem.

The lists need not be lists of "problem" words and phrases. As indicated above, they can also include words and phrases associated with information stored in or available to systems of the contact centre. Thus, a word/phrase list in a banking system might include "loan" and "overdraft". Recognition of either word could result in an alert issuing to an agent assistance application to retrieve the customer's credit rating from a credit bureau interface and to format this retrieved information in a screen pop on the agent's workstation.

The word and phrase lists need not be static. They can be generated dynamically for each new contact. So, for example, if a customer can be identified from a phone number, Internet address, or responses to prompts provided at the initiation of the contact (such as in an IVR session to which the customer is initially directed), then relevant information from various systems can be collated and converted into a word and phrase list.

An example of this is in a contact centre for ordering supplies. If the customer is a recognised customer, then details of the order numbers of all orders associated with that customer can be collated, along with details of all invoices to that customer, and catalogue part numbers for all parts ordered by the customer. This collection of numbers can be placed in a dynamically generated phrase list such that if a phrase such as "one-oh-three-five-Jay-nine" is detected and matched with an entry (i.e. 1035J9) on the dynamically generated list, an alert can be generated to the agent workstation interface to retrieve the details of the order/invoice/part number associated with this number and to present this automatically to the agent on-screen.

Additionally or alternatively, when the communications session is a voice call or a video call which includes speech data, the step of analysing data can involve recognising that one or both parties is speaking in a raised voice.

Preferably, in such cases, the step of analysing data involves determining a normal volume level for the speech of one or both parties and extrapolating a volume threshold above which a party is deemed to be speaking in a raised voice.

Additionally or alternatively, the step of analysing data can involve detecting a period of silence on the part of the agent and/or the user and the pattern is a period of silence of greater than a threshold duration.

The silence can be cumulative, i.e. a series of prolonged silences each shorter than the threshold can be added to indicate that a problem exists. Furthermore, the silence detection can be coupled with word and phrase recognition or other analysis methods to provide an increased or decreased likelihood that the silence indicates a situation requiring intervention. If, for example an agent is detected to say "just one moment while I check that", then it is less likely that the silence is significant, and the same is true if the silence is broken by the sound of a keyboard being used or the sound of pages being turned, each of which can indicate that the parties are not at an impasse but are otherwise occupied.

The detection of "silence" can include, in the case of a communications session involving the exchange of textual data (such as a chat or instant messaging session), detecting periods of inactivity on behalf of one or both parties.

If the communications session is an internet chat session or an instant messaging session, the step of analysing data can preferably involve recognising words or phrases in textual data and comparing the recognised words or phrases with one or more stored lists, whereby the pattern is a match between a recognised word or phrase and an entry in the one or more stored lists.

In a preferred embodiment, the step of receiving data from the communications session is accomplished by initiating a conference between the user and the agent and an automated data analysis system which receives communications session data from one or both of the user and agent.

One can use a media server or a conference bridge to carry out all voice or video calls between agent and user as a two-part conference, with the analysis system being added to the conference as a silent third party. A particular advantage of this method of effecting communications sessions is that in the event of a supervisor intervention the supervisor can be simply conferenced in without needing the call to be transferred to a separate conference.

Various alternatives can be provided for the step of issuing an alert. These can be selected from depending on the seriousness of the incident and the resources currently available in the contact centre.

For example, an alert can be issued to a supervisor workstation system of the contact centre effective to cause a supervisor at a workstation to be provided with an audible or visible alert.

In one such embodiment, the audible or visible alert includes a visible flag to be provided against the communications session on a display of the workstation which provides details of communications session under the supervision of the supervisor.

Preferably, the visible flag is selected from a series of flags each indicating a different condition. Thus, each agent call might have a flag displayed against it on the supervisor's workstation, with the flags being graded green, yellow, orange and red. Each call might start with a green flag, and progressive changes in the flag colour might be made in response to a number of alerts issuing on that call. A particularly serious violation of guidelines could of course result in a flag changing from green directly to red, indicating to the supervisor that a serious problem exists.

As a further example of an alert option, the alert can be issued to a contact centre management system effective to cause the contact centre management system to remove the agent from the communications session.

Another example is the issuing of an alert to a contact centre management system, effective to cause the contact centre management system to conference in a human supervisor to said communications session.

Yet another example is the issuing of an alert to a contact centre management system, effective to cause the contact centre management system to record the communications session.

Preferably, the step of analysing the data includes calculating a probability that a pattern match has been accurately detected.

The invention also provides a computer program for execution on a computer which receives data from a communications session between an agent of a contact centre and a user of the contact centre. The program causes the computer to:

a) analyse the data to locate a pattern of data indicative of a situation arising in the communications session for which an alert has been prescribed, and b) on recognising the pattern of data, issue an alert to a system of the contact centre.

The skilled person will appreciate that the program can be provided on magnetic or optical disk, it can be provided as an electrical signal, e.g. over the Internet, it can be provided pre-loaded on a computer system, it can be hard wired into a computing system forming part of a contact centre or it can be firmware which may be incorporated into a contact centre system.

The invention provides, in another aspect, a communications session monitoring system for monitoring a communications session between an agent of a contact centre and a user of the contact centre, the system comprising:

a) an input for receiving data from the communications session, b) a data pattern store for storing one or more patterns of data indicative of a situation arising in the communications session for which an alert has been prescribed, c) an data analysis engine for analysing the data to locate at least one of the one or more patterns of data, and d) an alert generator for issuing an alert to a system of the contact centre effective to notify a human supervisor or an automated system to effect an intervention in the communications session.

The invention also encompasses a contact centre comprising a communications session manager for managing a communications session between an agent of a contact centre and a user of the contact centre, and a system for monitoring the communications session, the monitoring system comprising:

a) an input for receiving data from the communications session, b) a data pattern store for storing one or more patterns of data indicative of a situation arising in the communications session for which an alert has been prescribed, c) an data analysis engine for analysing the data to locate at least one of the one or more patterns of data, and d) an alert generator for issuing an alert to the contact centre management system.

In another aspect there is provided a method of supervising one or more agents in a contact centre comprising the steps of:

a) upon one of the agents entering into a communications session with a user of the contact centre, providing data from the communications session to an automated data analysis unit;

b) analysing the data automatically to detect data elements indicative of a situation requiring supervisor intervention; and c) on detection of the data elements, alerting a supervisor of the situation indicated by the data elements.

DETAILED DESCRIPTION OF PREFERRED EMBODIMENTS

Figure 1:
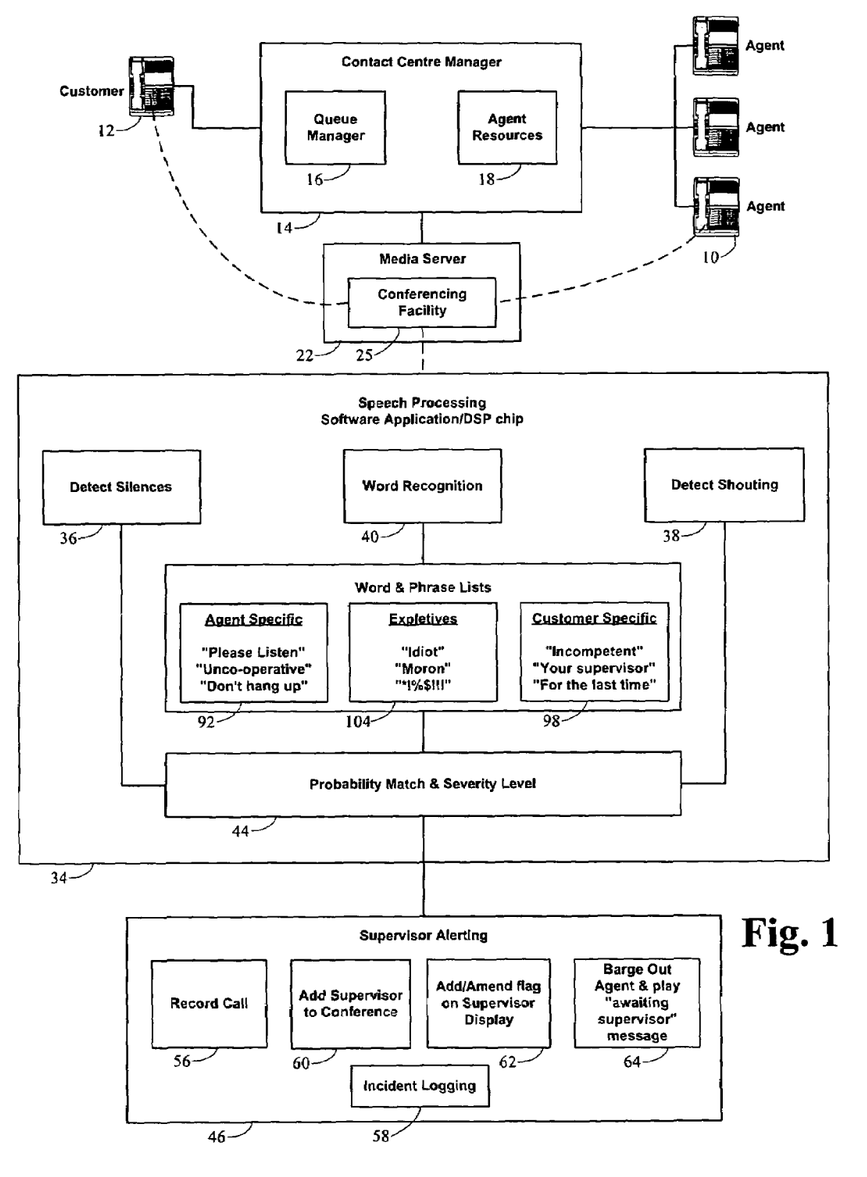
FIG. 1 is an architecture of a contact centre including a system for monitoring communications sessions.

FIG. 1 is a block diagram illustrating a system for monitoring communications sessions between an agent 10 and a customer 12 of a contact centre. The contact centre is not represented fully in FIG. 1. Instead, a contact centre manager application 14 is indicated, which includes a queue manager 16 and an agent resource monitor 18. The contact centre will include many other communications components and management systems which are not essential to the understanding of the invention, and of which the skilled person will be aware.

As is well known in the art, the contact centre manager 14 manages the queuing of contacts arriving at the centre using a queue manager 16, and assigns agents to deal with contacts at the top of various queues using an agent resource monitor 18. The management and operation of the contact centre in receiving, processing, queuing and assigning contacts is well known in the art and will not be described further, except as is necessary to illustrate the present invention.

Figure 2:
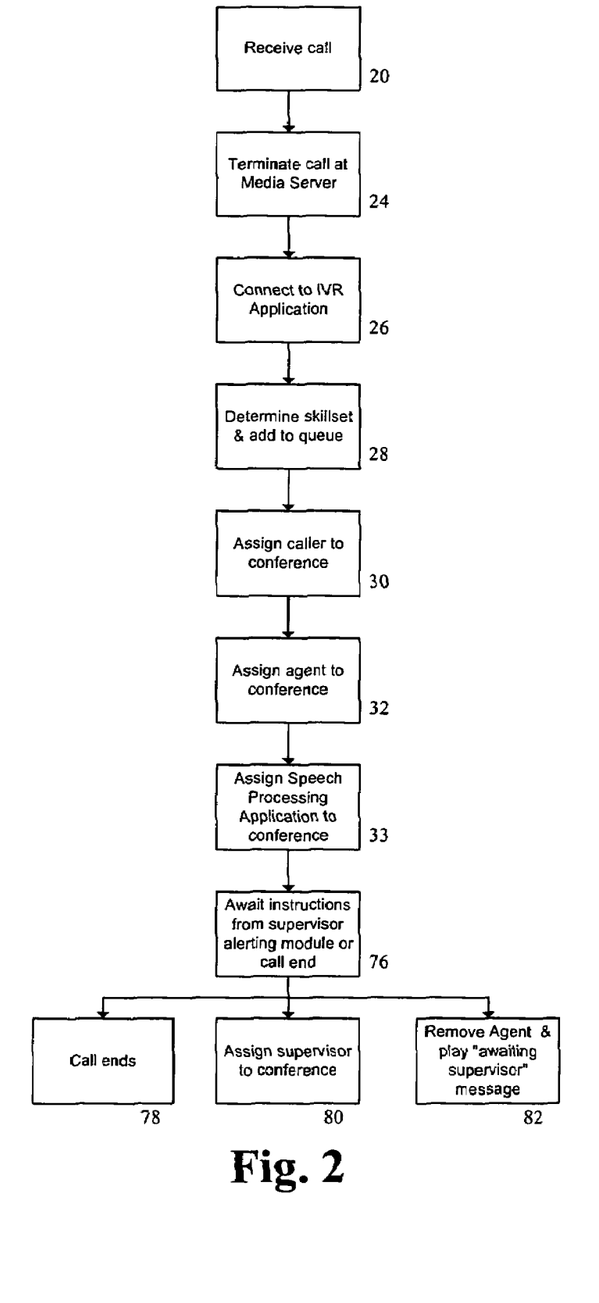
FIG. 2 is a flowchart of a process operating in a contact centre manager of FIG. 1.

One manner of dealing with newly arrived contacts is indicated by the first few steps of the flow chart of FIG. 2. Thus, when a call is received at the contact centre, step 20, it is terminated at a media server 22 (FIG. 1) under the control of the contact centre manager 14 (step 24 in FIG. 2). The media server 22 allows the call to be directed to various applications such as an interactive voice response (IVR) application or to voicemail facilities. In addition, a conferencing facility 25 is provided which allows an agent to be conferenced in to the customer to complete the call when the call is assigned to an agent.

Again, the skilled person will be aware of alternative implementations for a contact centre which may terminate the call at a PBX, place it on hold, direct to an interactive voice response facility, and ultimately connect the call from the PBX to an agent at an extension of the PBX. The routing of the call within the contact centre can be adapted to various other configurations of contact centre without difficulty.

Referring back to FIG. 2, the call is first connected to an IVR application, step 26, which prompts the user for responses with a series of questions or choices and which returns to the contact centre manager 14 a summary of the responses. These responses can be used to identify the customer and to determine the skillset(s) required by an agent to deal with the contact. From this information, the contact centre manager can queue the contact appropriately, step 28.

When the contact reaches the top of a queue and a suitable agent has been determined, the caller is assigned to a conference within the conferencing facility 25 (in other words, a conference is set up to which the customer 12 is the first party, step 30). Then the agent 10 selected to deal with the contact is also assigned to the conference, step 32.

The mechanism described above places the customer 12 and the agent 10 in a communications session, which in this case is a voice call. A similar or equivalent mechanism could be used to place the agent and customer in a videoconference. Alternative media types can be catered for in equivalent manner, such as by initiating a private chat room session between the customer and the agent in the case of web chat, or initiating an instant messaging session using an instant messaging server, etc. In the case of emails, an email submitted by the customer is maintained on an email server until it reaches the top of the queue and is then assigned to an agent. Unlike the other media types described, however, email is not a real-time communication facility and there is therefore not the same degree of interaction.

Once the agent and customer have been placed in a communications session, a speech processing application is assigned to the conference in step 33. This speech processing application 34 processes the voice signals received from the conference (i.e. the conversation between the customer and agent) and conducts various analyses on the received signals to determine whether an incident requiring supervisor intervention or the provision of automated assistance has occurred. Referring back to FIG. 1, it can be seen that three exemplary functions are implemented in the speech processing application (or a digital signal processing (DSP) chip implementing such an application). The application 34 includes a function 36 for detecting silences, a function 38 for detecting shouting, and a function 40 which performs a word recognition function. The purpose of providing the silence detector 36 and shouting detector 38 is that either long silences or raised voices can be indicative of a problem in communication, such as an argument or an impasse between the customer and agent. The word recognition function 40 converts the speech signals to a stream of words and phrases and then uses word and phrase lists 42 to detect words or phrases indicative of a problem in communication or an opportunity to provide automated assistance to the agent, as will be described in more detail.

In overview, each of the functions 36, 38, 40 searches for pattern matches against predetermined criteria and then reports such matches to a software function 44 which examines the probability that the match is in fact correct and the likely severity level of the problem based on the nature of the incident reported. This latter function 44 issues alerts to a supervisor alerting module 46 which takes appropriate action based on internal rules. Such action can involve logging the incident, ignoring the incident, alerting a supervisor, or instructing the contact centre manager to take an action to influence the conference itself.

While the embodiment illustrated is configured to search for problematic communications, it can be easily modified to provide agent assistance as opposed to or in addition to agent intervention. For example the word and phrase lists can include items indicative of an opportunity to offer assistance or additional information to the agent (either as static lists or as dynamically generated lists), and the supervisor alerting module can be accompanied by an agent alerting module which receives alerts when an opportunity of this type arises and which contains modules designed to retrieve the context-sensitive help or information from various systems of the contact centre and to present them to the agent (or to present to the agent the option of accessing such help or information).

Figure 3:
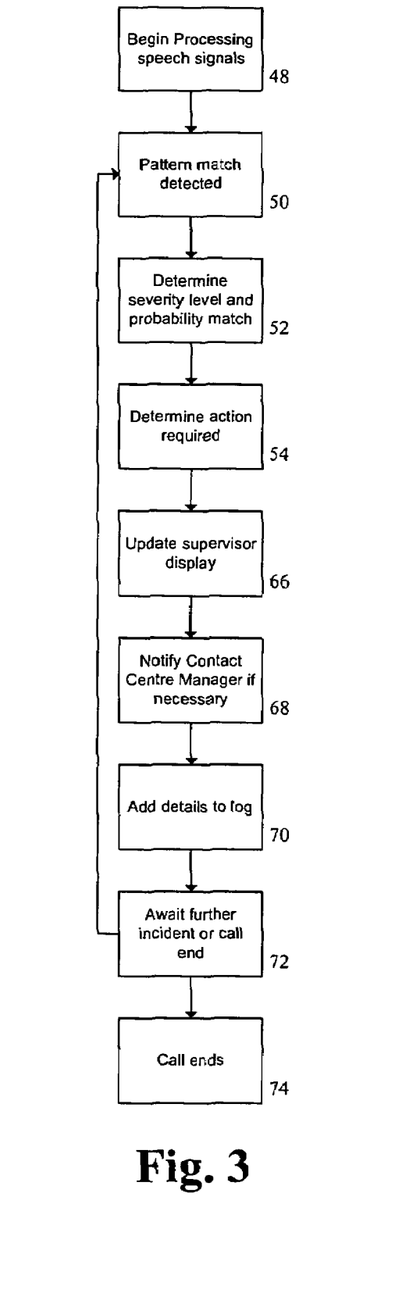
FIG. 3 is a flowchart of a process operating in a speech processor of FIG. 1.

Describing the process in more detail, when the contact centre manager 14 has assigned the speech processing application to the conference, step 33, the speech processing application 34 begins to process speech signals, as indicated at step 48, FIG. 3. The sound signals from the conference between the customer and the agent are fed to each of the detector functions 36, 38, 40, each of which tries to detect a pattern for which it is configured (such as a silence, raised voices, or a word on the word lists 42). When a pattern match is detected, step 50, the probability match and severity level function 44 carries out its calculations, step 52, and issues an alert to the supervisor alerting function or an agent alerting function (not shown) if appropriate, step 46.

The supervisor alerting function determines the action required based on the details of the alert received, step 54. As indicated in FIG. 1, various actions are available to the supervisor-alerting module. At a first level of seriousness, the call can simply be recorded for future review as indicated by block 56. To implement function 56, the contact centre manager would be instructed to direct the media server 22 to add a recording application to the conference between the customer 12 and agent 10 on conferencing facility 25. An incident logging unit 58 notes that the call has been recorded and maintains a record of the address (e.g. location on disk) where the recording is stored so that the supervisor can subsequently review the recording and take any follow-up action deemed necessary with the agent.

The supervisor-alerting module 46 also has a functional block 60 to add the supervisor to the conference. If this decision is followed, the contact centre manager 14 will be instructed to take the necessary action to conference the supervisor into the communications session using the conferencing facility 25 of the media server 22. In addition, the supervisor will be alerted by means of a screen pop-up on a supervisor workstation application that he or she is automatically being conferenced in. The screen pop-up can also indicate details of the incident causing this automatic conferencing. If no supervisor is available, then all relevant supervisors may be issued with an alert, and the first available supervisor to respond can then be conferenced in by the contact centre manager 14.

A third option, represented by function 62, is to add or amend a flag which is set against this particular agent-customer communications session on the supervisor's display. Thus, for example, the supervisor workstation might include a window displaying all communications sessions currently in progress involving the agents under supervision. At the beginning of each new session, each agent-customer interaction might be assigned a green flag to indicate that no problems have been detected in the session. As one or more incidents are detected, and depending on the severity level of the incident as determined in step 52, the flag might progress from green to yellow to orange to red. The supervisor can therefore see at a glance which of the communications sessions most require intervention and can act accordingly. In addition, this allows particular agents who are known to be problematic to have a starting level of, for example, a yellow flag. The actions for such agents would be escalated more quickly allowing earlier intervention. Similarly, new agents who are in training might be assigned a higher starting level.

A more radical option is represented by function 64. If the supervisor alerting module 46 decides to take this action, e.g. if the word recognition function 40 detects that the agent has resorted to obscenity or abusive language, this module instructs the contact centre manger to remove the agent from the conference completely (to "barge out" the agent) and to direct the call to a recorded message stating that for quality control reasons the call is automatically being redirected to a supervisor. Again, each supervisor display would be updated to indicate that there was a call requiring urgent intervention, optionally with an indication of why this occurred, and the first free supervisor could then placate the customer if required and complete the call with the customer.

The incident logging unit 58 can log any or all incidents reported to the supervisor alerting module and the actions taken by the supervisor alerting module. This allows the system to be fine tuned in order to reduce the number of false alarms and to increase the accuracy of the speech processing application.

Referring back to FIG. 3, therefore, after the supervisor alerting module 46 has determined that a particular action is required in step 54, the supervisor display is updated (if this is part of the action to be taken), step 66, and the contact centre manager is notified of any action which it should take to influence the conference (again if this is necessary), step 68. The details of the incident are added to the log in the incident logging unit 58, step 70. The process continues with the speech processing application processing further sound signals to determine if any further incidents have occurred or to determine of the call has ended, step 72.

The process terminates when the call ends, step 74. Referring back to FIG. 2, which represents the processes occurring within the contact centre manager, the process continues after the speech processing application has been assigned to the conference, step 33. The contact centre manager awaits the call end or some instructions from the supervisor alerting module 46 (in step 68 of FIG. 3) to take a particular action, step 76. Some examples given are that the call may end without any instructions being received, step 78, or that the supervisor is to be assigned to the conference, step 80, or that the agent is to be "barged out", i.e. removed from the conference, and that the call is to be redirected to the application which plays back the "awaiting supervisor" message, step 82 (in response to the function 64 within the supervisor alerting module 46).

Figure 4:
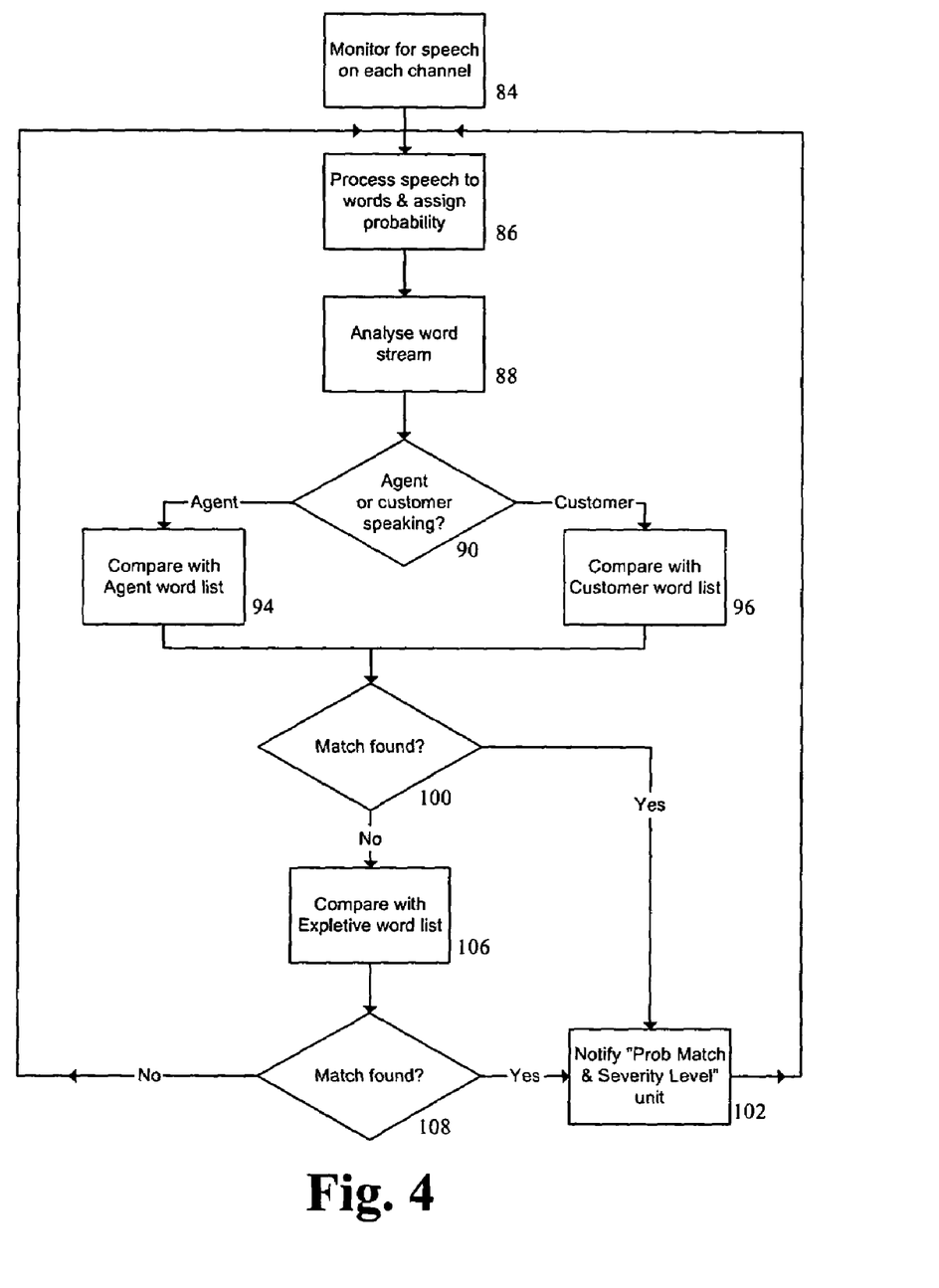
FIG. 4 is a flowchart of a process operating in a word and phrase recognition module of the speech processor of FIG. 1.

FIG. 4 provides an example of the operation of the word recognition facility 40 within the speech processing application 34. The speech signals from each channel (i.e. the customer on the one hand and the agent on the other) are monitored individually, step 84. The speech from each channel is processed to words using appropriate word and phrase recognition software. Probabilities are assigned to each conversion, and optionally, the output can be a stream of alternatives, each with its own probability. Thus, as a simple example, a particular sound might be output as the alternatives: "to" (30%), "two" (30%), "too" (30%) and "do" (10%). Sophisticated voice processing software will of course use context-based algorithms to improve the match of particular words and phrases, and since any appropriate speech interpretation software can be used, the particular algorithms used to process speech are outside the scope of this invention. After the conversion in step 86, the word stream is analysed, step 88. The first step of the analysis is to split the word stream between words spoken by the customer and words spoken by the agent, decision 90. This need not be a real time decision, since the speech from each channel can be flagged as appropriate from the source and thereby directed into different processes. In the case of words spoken by the agent, a comparison is made with various phrases maintained in an agent-specific word list 92 (FIG. 1) in step 94.

Similarly, the stream of words and phrases generated from the speech data received on the customer channel is compared in step 96 with a customer-specific word list 98 (FIG. 1) which contains words and phrases deemed by the contact centre administration to be indicative of a customer involved in an unsatisfactory contact session.

If a match is found either in the agent word list or the customer word list, decision 100, notification is sent to the probability match and severity level determination unit 44, step 102. If no match is found in decision 100, the word or phrase is compared with an expletive word list 104, step 106, to determine whether a match is found, decision 108. Again, if a decision is found, details are notified to the probability match and severity level determination unit in step 102.

If a notification is sent in step 102, then the probability match and severity level determination unit will issue an alert based on predetermined rules according to the severity level and the probability.

It will be appreciated that while only three lists are shown in the exemplary embodiment described above, there can be fewer or more lists as appropriate to fine tune the system. For example, expletives could be categorised by their level of offensiveness, or the agent-specific or customer-specific words could be maintained in a number of lists, or in sub-categories in a single list, each indicating a different type of problem.

It will also be appreciated that while the processing is described in terms of the processing of speech in the voice call, it is also possible to process text streams (indeed it is easier to process plain text data) received in a chat session or instant messaging session or to process emails maintained on an email server and queued for action by an agent (or the outgoing emails sent by an agent in response). Again, it will be appreciated that emails provide a slightly different set of problems and solutions in that they do not generally represent a real-time exchange and there is therefore less need for a supervisor to intervene directly and instantly.

A further option is available in video calls where image processing software can, in an analogous manner to speech processing software, process images of the agent or customer, and conduct image and movement pattern matching against a set of gestures, facial expressions, or body language poses indicative of a difficulty in communication between the parties. Again, the details of the image processing implementation are left to the discretion of the system designer, and as image processing software becomes more powerful, this aspect will increase in sophistication. One could, for example, dispense with sound processing entirely if the video analysis was sufficiently sophisticated to. "lip read" what was being said in addition to analysing the body language of the participants in the video conference.

Figure 5:
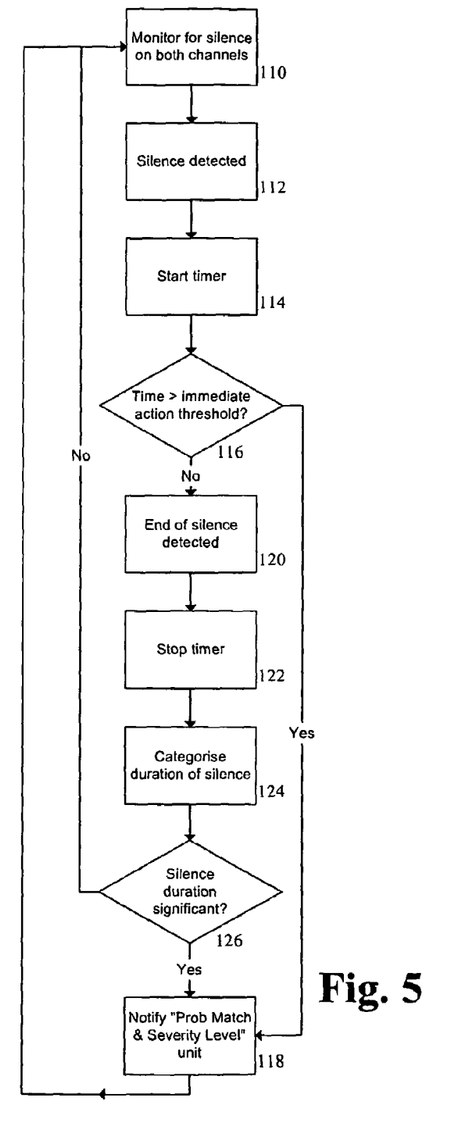
FIG. 5 is a flowchart of a process operating in a silence detection module of the speech processor of FIG. 1.

The functional module 36 for detecting silences operates as indicated in FIG. 5. When activated it monitors for silence (i.e. volume levels below a certain threshold) on both channels. This can be calibrated to take account of ambient noise detected on each channel, step 110. If silence is detected simultaneously on both channels, step 112, a timer is started, step 114. This timer continues to run until an "immediate action threshold" is exceeded, step 116. This threshold indicates that the level of silence on both sides has been unacceptably long and that immediate action is required.

Notification of this condition is sent to the probability match and severity level unit, step 118, which assigns a probability that the silence on both sides was in fact of a duration warranting immediate action. For example, there may have been some noise just below a threshold level which might make it less likely that the silence was significant. In addition, the probability match and severity level unit may refer to the word recognition module when a silence is detected in order to determine whether one of the parties had signalled in advance that there would be a silence. This could be determined, for example by a phrase such as "please wait one moment" having been detected immediately before a significant silence. In the event that action is determined to be required, an appropriate alert is sent to the supervisor-alerting module 46 as previously described.

If, however, before the time reaches the immediate action threshold in step 116 an end of silence is detected, step 120, the timer is stopped, step 122 and the duration of silence between the starting and stopping of the timer is categorised, step 124. Categorisation might be simply a calculation of the duration or it might be the assignment of the duration into one of a number of levels (e.g. level 1 might be a relatively short silence whereas level 5 might be a very long silence just below the immediate action threshold). It may be the case that the silence is not sufficiently long to be categorised as significant, in which case decision 126 directs the process back to step 110. However if the silence is of significant duration in decision 126, a notification is again sent to the probability match and severity level unit as previously described.

Figure 6:
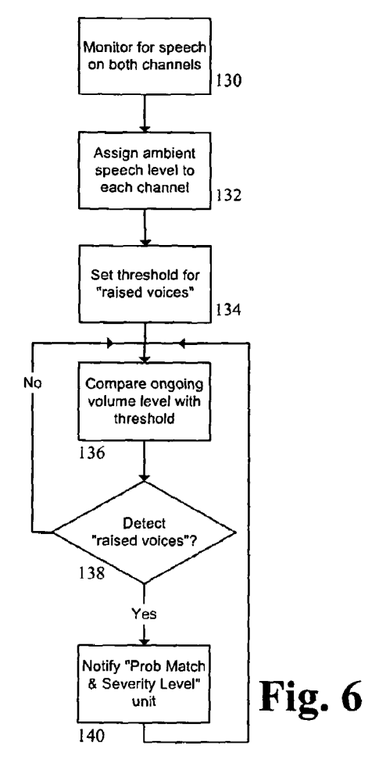
FIG. 6 is a flowchart of a process operating in a shouting detection module of the speech processor of FIG. 1.

The operation of the functional module 38 for detecting shouting is illustrated in FIG. 6. When the speech data from each channel is fed to module 38, it monitors firstly for speech (i.e. a signal) on both channels, step 130. This monitoring for speech may be simply looking for any signal, or it may be more sophisticated e.g. with pre-processing to filter out noises which do not have the characteristics of speech in terms of frequency distributions, etc.

An ambient speech level is assigned to each channel, step 132. This can be revised over time as both parties speak and can begin at a default level which is the expected volume of normal speech from the agent and from the customer.

From this ambient level, a threshold is set for "raised voices" or shouting, step 134. Experience will determine how much louder a voice would need to be if it is to be indicative of a problem, and again this can be fine-tuned over time to eliminate false negatives and to ensure that actual incidences of shouting are not overlooked. However, the module 38 then continually compares the ongoing volume level of speech on each channel with the threshold for that channel, step 136, and decides whether the volume level is high enough to denote a "raised voices" condition, step 138. When such a condition is detected, a notification is sent to the probability match and severity level unit, step 140, which issues an alert if appropriate to the supervisor-alerting module 46.

While many different types of sound, video and text processing can be employed, the fundamental benefit provided is that communications sessions can be automatically monitored, particularly in the context of real-time communications sessions, to determine whether or not supervisor intervention may be needed based on the characteristics of the communications session. It will appreciated by the skilled person that the sophistication of discrimination is limited only by the analysis technology available for the medium in question and the ingenuity of the designer who decides which characteristics of speech, text or movement to look for.

Furthermore, while the illustrated embodiments are described mainly with reference to the detection of situations requiring intervention, they can be modified in the manner described herein to detect opportunities and situations in which assistance or information can be offered to the agent or automatically presented to the agent based on the monitoring of data within the communications session. Such context sensitive information and help is likely to be better targeted and more appropriate than help and information screens generated at the beginning of an agent-user session as standard pop-ups based on call progress or IVR inputs. The embodiments described herein may be modified or varied without departing from the spirit and scope of the claimed invention.

What is claimed is:

1. A method of monitoring a voice communications session between an agent of a contact centre and a user of said contact centre comprising the steps of:
    a) receiving voice data from said communications session,
    b) analysing said voice data to locate a pattern of data indicative of a situation arising in the communications session for which an alert has been prescribed, said pattern of data corresponding to one or more predefined words or phrases, and
    c) on recognising said pattern of data, issuing an alert which is effective to provide said agent with information which is available to a system of the contact centre and which appears relevant to the one or more predefined words or phrases located in the received voice data exchanged in the communications session.

2. A method as claimed in claim 1, wherein said alert is effective to notify a human supervisor or an automated system to effect an intervention in said communications session.

3. A method as claimed in claim 1, wherein said communications session is a real-time communications session and said step of analysing said data is performed in real time as the communications session progresses, whereby said alert can issue in real time to affect the communications session in the event of said pattern being detected.

4. A method as claimed in claim 3, wherein said communications session is one of a voice telephony call, and a video call.

5. A method as claimed in claim 4 wherein said step of analysing data comprises recognising words or phrases in speech data and comparing said recognised words or phrases with one or more stored lists, whereby said pattern is a match between a spoken word or phrase and an entry in said one or more stored lists.

6. A method as claimed in claim 1, wherein said step of receiving data from said communications session comprises initiating a conference between the user and the agent and an automated data analysis system which receives communications session data from one or both of the user and agent.

7. A method as claimed in claim 1, wherein said step of issuing an alert further comprises issuing an alert to a supervisor workstation system of the contact centre effective to cause a supervisor at a workstation to be provided with an audible or visible alert.

8. A method as claimed in claim 6, wherein said audible or visible alert includes a visible flag to be provided against said communications session on a display of the workstation which provides details of communications session under the supervision of said supervisor.

9. A method as claimed in claim 6, wherein said visible flag is selected from a series of flags each indicating a different condition.

10. A method as claimed in claim 1, wherein said step of issuing an alert further comprises issuing an alert to a contact centre management system effective to cause said contact centre management system to remove said agent from said communications session.

11. A method as claimed in claim 1, wherein said step of issuing an alert further comprises issuing an alert to a contact centre management system, effective to cause said contact centre management system to conference in a human supervisor to said communications session.

12. A method as claimed in claim 1, wherein said step of issuing an alert further comprises issuing an alert to a contact centre management system, effective to cause said contact centre management system to record the communications session.

13. A method as claimed in claim 1, wherein said step of analysing said data includes calculating a probability that a pattern match has been accurately detected.

14. A computer program product comprising instructions in machine readable form which, when executed on a computer which is in receipt of data from a voice communications session between an agent of a contact centre and a user of said contact centre, are effective to cause the computer to:
   a) analyse received voice data from said communications session to locate a pattern of data indicative of a situation arising in the communications session for which an alert has been prescribed, said pattern of data corresponding to one or more predefined words or phrases, and
   b) on recognising said pattern of data, issue an alert which is effective to provide said agent with information which is available to a system of the contact centre and which appears relevant to the one or more predefined words or phrases located in the received voice data exchanged in the communications session.

15. A communications session monitoring system for monitoring a voice communications session between an agent of a contact centre and a user of said contact centre, the system comprising:
   a) an input for receiving voice data from said communications session,
   b) a data pattern store for storing one or more patterns of data indicative of a situation arising in the communications session for which an alert has been prescribed said patterns of data corresponding to one or more predefined words or phrases,
   c) an data analysis engine for analysing said data to locate at least one of said one or more patterns of data, and
   d) an alert generator for issuing an alert which is effective to provide said agent with information which is available to a system of the contact centre and which appears relevant to the one or more predefined words or phrases located in the received voice data exchanged in the communications session.

16. A contact centre comprising a communications session manager for managing a communications session between an agent of a contact centre and a user of said contact centre, and a system for monitoring said communications session, the monitoring system comprising:
   a) an input for receiving data from said communications session,
   b) a data pattern store for storing one or more patterns of data indicative of a situation arising in the communications session for which an alert has been prescribed, said pattern(s) of data corresponding to one or more predefined words or phrases,
   c) an data analysis engine for analysing said data to locate at least one of said one or more patterns of data, and
   d) an alert generator for issuing an alert which is effective to provide said agent with information which is available to the contact centre management system and which appears relevant to the one or more predefined words or phrases located in the received voice data exchanged in the communications session.

17. A contact centre as claimed in claim 16, wherein said intervention comprises adding to the communications session a supervisor of the contact centre.

* * * * *